(12) United States Patent
Gerbault et al.

(10) Patent No.: US 6,324,661 B1
(45) Date of Patent: Nov. 27, 2001

(54) METHOD FOR MANAGING DATA INTEGRITY FAULTS IN A RE-WRITEABLE MEMORY

(75) Inventors: Eric Gerbault, Le Kremlin Bicêtre; Olivier Franchi, Issy les Moulineaux; Jean-Marc Gambin, Ecquevilly, all of (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/284,716
(22) PCT Filed: Oct. 15, 1997
(86) PCT No.: PCT/FR97/01842
§ 371 Date: Apr. 19, 1999
§ 102(e) Date: Apr. 19, 1999
(87) PCT Pub. No.: WO97/18108
PCT Pub. Date: Apr. 30, 1998

(30) Foreign Application Priority Data

Oct. 23, 1996 (FR) ................................................ 96 13024

(51) Int. Cl.[7] .................................................. G11C 29/00
(52) U.S. Cl. .................................... 714/718; 714/807
(58) Field of Search .............................. 714/718, 807, 714/799, 14, 22

(56) References Cited

U.S. PATENT DOCUMENTS 4,837,744  6/1989  Marquot .
6,101,620 * 8/2000  Ranganathan ........................ 714/718

FOREIGN PATENT DOCUMENTS

| 0 724 238 A1 | 7/1996 | (EP) . |
| 0 727 785 A1 | 8/1996 | (EP) . |
| 2 473 755 | 7/1981 | (FR) . |

* cited by examiner

Primary Examiner—Phung M. Chung
(74) Attorney, Agent, or Firm—Frishauf, Holtz, Goodman, Langer & Chick, P.C.

(57) ABSTRACT

A method of managing integrity defects concerning data written in a rewritable memory of an electronic component, said electronic component being suitable for performing operations that are capable of modifying at least some of said data and of interchanging information relating to said operations either off-line, directly with a terminal, or else on-line, with an issuer via said terminal. According to the invention, said method consists in: defining firstly "main" data in which an integrity defect is representative of faulty operation of the rewritable memory, and secondly "secondary" data in which an integrity defect is representative either of faulty operation of the rewritable memory, or else of an interruption in the power supply to the electronic component; on each operation, checking the integrity of at least some data; if a check on the integrity of at least some of the main data reveals an integrity defect, preventing any further operation; and if an integrity check on secondary data reveals an integrity defect, allocating at least one default value to at least one item of secondary data, thereby requiring an interchange to be performed on-line during the following operation. The invention is applicable to making secure transactions performed by means of electronic memory cards.

5 Claims, 1 Drawing Sheet

METHOD FOR MANAGING DATA INTEGRITY FAULTS IN A RE-WRITEABLE MEMORY

FIELD OF THE INVENTION

The present invention relates to a method of managing integrity defects of data written into a rewritable memory of an electronic component.

A particularly advantageous application of the invention lies in the field of providing security for electronic transactions performed between an electronic component on a card, referred to as "an electronic memory", and a terminal connected to an issuer managed by an operator: a bank card undertaking or some other operator.

Under such circumstances, the electronic component of the card performs operations, e.g. erasing and/or writing, capable of altering the data written in the rewritable memory, and it exchanges information concerning the operations it has performed, either directly with the terminal in an off-line mode of operation, or with the issuer via the terminal in an on-line mode of operation. Which of those two modes of operation is selected depends on pre-established criteria, for example if the amount involved in the transaction is less than a certain threshold, then communication takes place off-line, whereas above the threshold the transaction must be performed on-line, with authorization from the issuer being necessary under such circumstances.

BACKGROUND OF THE INVENTION

As a general rule, the electronic memory cards used for performing electronic transactions, e.g. of the credit/debit type, have EEPROM or flash EPROM memories giving the two advantages of being non-volatile and of being electrically erasable, and thus of being rewritable. However they can be reprogrammed a limited number of times only and they take a long time to be programmed.

In certain applications, it can happen that these memories are corrupted for one or other of the following reasons:

- too large a number of rewrite operations, wearing out certain memory cells and giving rise to faulty operation of the electronic memory;
- programming performed for a very short time only, giving rise to insufficient charge in the memory cells; and/or
- accidental interruption of the electrical power supply during programming, giving rise to the same effect, or indeed to earlier values being erased without new values being programmed.

This third risk is particularly important in applications such as electronic memory cards where said memory is on board an object whose power supply is external and from which it can be separated at all times.

Nevertheless, it can be seen that these causes of corruption giving rise to integrity defects in the data written in the rewritable memory are not equivalent. A memory that is misfunctioning because of cell wear is final and irreversible, whereas writing errors due particularly to the card being taken out of the terminal too soon or to the electronic component losing its power supply voltage are isolated accidents that do not involve the general operation of the system.

SUMMARY OF THE INVENTION

Thus the technical problem to be solved by the present invention is to provide a method of managing integrity defects of data written in a rewritable memory of an electronic component, said electronic component being suitable for performing operations capable of modifying at least some of said data and of interchanging information relating to said operations, either directly off-line with a terminal or on-line with an issuer via said terminal, which method makes it possible to distinguish between integrity defects due to faulty operation of the electronic memory making the component and the electronic card irremediably unusable and integrity defects associated with incidents that interfered with the electrical power supply to the electronic component without the general operation of the electronic memory card being involved.

DETAILED DESCRIPTION OF THE INVENTION

Figure 1:
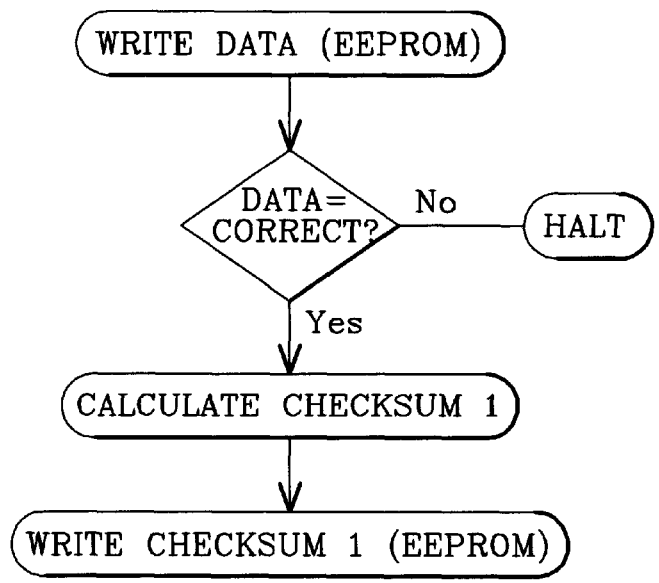
FIG. 1 is a flow-chart diagram illustrating a writing operation in accordance with the invention.

According to the present invention, the solution to the technical problem posed consists in that said method consists in:

- defining firstly "main" data in which an integrity defect is representative of faulty operation of the rewritable memory, and secondly "secondary" data in which an integrity defect is representative either of faulty operation of the rewritable memory, or else of an interruption in the power supply to the electronic component;
- on each operation, checking the integrity of at least some data;
- if a check on the integrity of at least some of the main data reveals an integrity defect, preventing any further operation; and
- if an integrity check on secondary data reveals an integrity defect, allocating at least one default value to at least one item of secondary data, thereby requiring an interchange to be performed on-line during the following operation.

Thus, when an integrity effect is detected involving any part of said main data it is necessarily deduced that the defect is due to irreversible faulty operation of the rewritable memory, e.g. due to memory cell wear.

This integrity defect will be presented each time a user seeks to perform any operation, giving rise to the same consequence of said operation being refused again. The holder of the faulty electronic memory card, perceiving that the card has become unusable, must then request another card from the issuing organization.

In contrast, if the integrity defect appears in secondary data, doubt can remain as to the origin of said defect. That is why, instead of definitively banning operation, as is the case when an integrity defect concerns main data, it is preferred to enable the memory card to operate again during the following operation, the integrity defect observed during the preceding operation was due merely to a power supply problem without the ability of the card to operate normally being implicated. However, if the origin of the integrity defect in secondary data is cell wear of the rewritable memory, or any other irremediable faulty operation, then the step of giving the value by default which requires writing in the memory cannot be performed, and as a result, on the next operation, there will be again an integrity defect in the secondary data, and so on until the user understands that the card is not working and informs the issuing organization of this anomaly to have a new card issued.

For example, main data can be unchanging data relating to the identity of the issuer and/or of the holder of the card which includes the electronic component and the rewritable memory. This data is written in a read-only memory of the component and is never modified during successive operations performed by the operator using the electronic memory card. This data is thus insensitive to any fluctuation in the electrical power supply to the card, and in particular it is insensitive to the card being withdrawn from a terminal at the wrong time, and if an integrity defect is observed in this data, that can only be because of irreversible faulty operation of the electronic memory, which is why the decision is taken to prevent any subsequent operation if this kind of integrity defect occurs.

Main data may also be comprised by variable data protected by a backup device against interruptions of the electrical power supply to the electronic component. This is data which is modified on each operation and which is thus liable to be corrupted by a failure in the power supply to the component, but which also benefits from a backup and recovery system so that it is possible at all times to access the most recent validated value of the data subject to said system.

In electronic memory cards that can be used for performing debit/credit electronic transactions, main data of this type is constituted, for example, by the transaction counter which is incremented by 1 on each operation. This counter must under no circumstances be lost since that would give the proprietor of the card the possibility of denying certain transactions. That is why it is protected by a backup device, such as that described in French patent application No. 95/15186 in the name of the Applicants.

Under such circumstances, an integrity defect observed in the value of the transaction counter reveals faulty operation of the rewritable memory and not of the electrical power supply to the electronic component, and as a result it gives rise to an absolute ban on performing any further transactions.

The secondary data can be very diverse, and by way of example, mention can be made of the following:

an "on-line" flag constituted by a single bit (0 or 1) in a file. If the electronic component decides to establish an on-line link with the issuer, e.g. if the amount of a transaction exceeds a given value, then the "on-line" flag is set to 1. Thereafter, it is verified that the on-line link has been properly established, and if so the flag is reset to 0. Thus, if on the following transaction the "on-line" flag is still at 1, then the previous on-line transaction was not properly performed;

flags for authenticating the issuer and/or the electronic memory card. These are likewise 0 or 1 bits which normally take the value 0 if authentications have indeed been verified successfully, with the value 1 revealing a problem of authentication;

copying the transaction counter after each on-line operation. Comparing the values of the transaction counter and of its copy makes it possible to take a decision whether an on-line operation should be performed. Too great a difference between these values indicates that the most recent on-line operation is old and thus that the next operation must be performed on-line, specifically so as to be able to perform certain integrity checks.

FIG. 1 illustrates the following procedure for writing any data in the rewritable memory of the electronic component (EEPROM):

(1) writing the data (WRITE DATA) in the rewritable memory (EEPROM);

(2) verifying that the writing is correct (DATA= CORRECT?);

(3) if the writing is correct (Y):

(a) calculating a checksum, referred to as a "first" checksum (CHECKSUM 1), on the basis of the value of the data written in the memory; and (b) writing the checksum (WRITE CHECKSUM 1) in the rewritable memory (EEPROM); or (4) if the writing is not correct (N), halting the current operation (HALT).

It will be understood that on each operation, calculating and writing the first checksum for given data are performed only after the value of the data has been written in the rewritable memory and it has been verified that it is correct. In this way, if an integrity defect occurs while writing the data, be it main data or secondary data, and for whatever reason, the current operation is cancelled. However, if the written data is correct, said first checksum corresponding to the data is calculated and written in turn in the rewritable memory. If an integrity defect occurs when writing the first checksum, that will be detected during the following operation since, in accordance with the invention, provision is made in general manner for an integrity check to consist at the beginning of an operation in calculating a second checksum for the data on the basis of the value of said data as present in the rewritable electronic memory, and in comparing said second checksum with a first checksum as written in said memory during the preceding operation.

Figure 2:
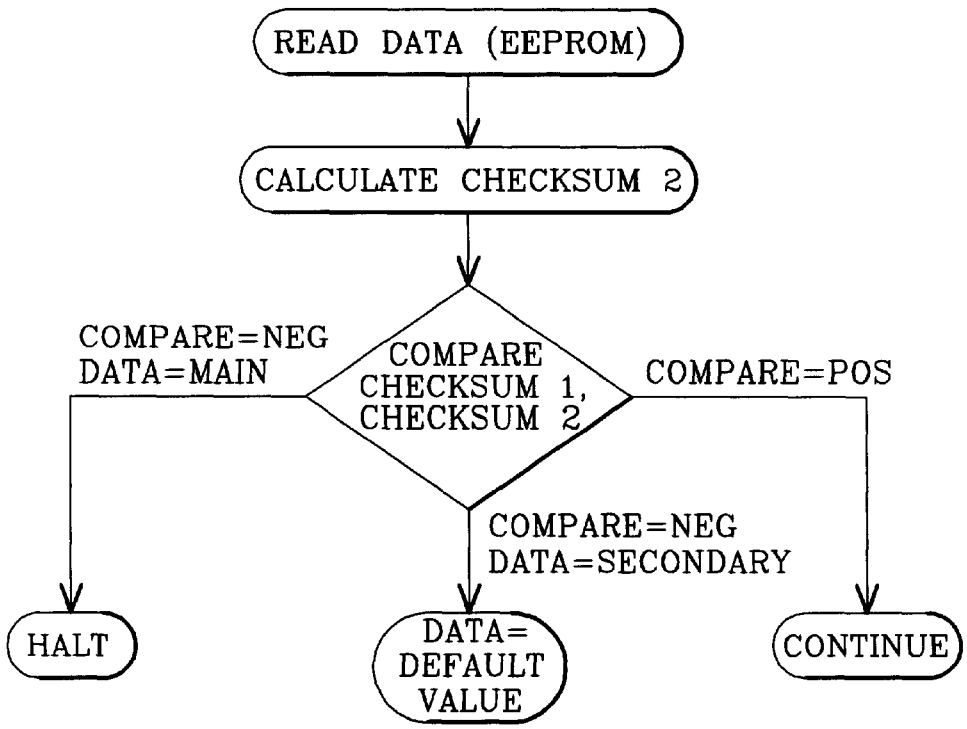
FIG. 2 is a flow-chart diagram illustrating a reading operation in accordance with the invention.

FIG. 2 illustrates a reading of any data in the rewritable memory. The reading takes place as follows:

(1) the data is read (READ DATA) in the memory (EEPROM);

(2) the second checksum (CHECKSUM 2) is calculated;

(3) the second checksum is compared with the first checksum as written in the memory during the preceding operation (COMPARE CHECKSUM 1, CHECKSUM 2);

(4) if a negative comparison (COMPARE=NEG) reveals an integrity fault concerning main data, (DATA=MAIN), the operation is prevented from continuing (HALT) since under such circumstances the reason for the comparison being negative is faulty operation of the memory;

(5) if a negative comparison (COMPARE=NEG) reveals an integrity defect concerning secondary data (DATA= SECONDARY), a default value is given to the data (DATA= DEFAULT), with the default value requiring an on-line interchange during the following operation; and (6) if the comparison is positive (COMPARE=POS), then the operation is continued (CONTINUE).

What is claimed is:

1. A method of managing integrity defects concerning data written in a rewritable memory of an electronic component, said electronic component being suitable for performing operations that are capable of modifying at least some of said data and of interchanging information relating to said operations either off-line, directly with a terminal, or else on-line, with an issuer via said terminal;

the method being characterized in that it consists in:

defining firstly "main" data in which an integrity defect is representative of faulty operation of the rewritable memory, and secondly "secondary" data in which an integrity defect is representative either of faulty operation of the rewritable memory, or else of an interruption in the power supply to the electronic component;

on each operation, checking the integrity of at least some data;

if a check on the integrity of at least some of the main data reveals an integrity defect, preventing any further operation; and if an integrity check on secondary data reveals an integrity defect, allocating at least one default value to at least one item of secondary data, thereby requiring an interchange to be performed on-line during the following operation.

2. A method according to claim 1, characterized in that an integrity check consists, at the beginning of an operation, in calculating a second checksum relating to the data on the basis of the value of said data present in the rewritable electronic memory, and in comparing said second checksum with a first checksum written in said memory during the preceding operation.

3. A method according to claim 2, characterized in that, on each operation, the first checksum concerning data is calculated and written only after the value of the data has been written in the rewritable memory, and it has been verified for correctness.

4. A method according to claim 1, characterized in that said main data comprises fixed data relating to the identity of the issuer and/or of the holder of the electronic component.

5. A method according to claim 1, characterized in that said main data comprises variable data protected by a backup device for providing protection against interruptions in the power supply to the electronic component.

* * * * *